United States Patent [19]

Eastman et al.

[11] Patent Number: 5,015,831
[45] Date of Patent: May 14, 1991

[54] SCAN MODULES FOR BAR CODE READERS AND THE LIKE IN WHICH SCAN ELEMENTS ARE FLEXURALLY SUPPORTED

[75] Inventors: Jay M. Eastman, Pittsford; John A. Boles, Fishers, both of N.Y.

[73] Assignee: Photographic Sciences Corporation, Rochester, N.Y.

[21] Appl. No.: 267,873

[22] Filed: Nov. 7, 1988

[51] Int. Cl.⁵ .................. G11B 7/135; G06K 7/10
[52] U.S. Cl. .................... 235/462; 235/472; 235/470; 350/6.1; 350/6.6
[58] Field of Search ............ 350/6.1, 6.3, 6.6; 250/566, 568; 235/462, 472, 470, 467, 454; 369/119, 221, 244, 112, 44.14, 44.15, 44.16

[56] References Cited

U.S. PATENT DOCUMENTS

| | | | |
|---|---|---|---|
| 4,051,529 | 9/1977 | Miyaoka | 369/112 |
| 4,135,206 | 1/1979 | Kleuters et al. | 369/44.15 |
| 4,578,571 | 3/1986 | Williams | 235/472 |
| 4,667,255 | 5/1987 | Lindberg | 235/470 |
| 4,732,440 | 3/1988 | Gadhok | 350/6.6 |
| 4,782,475 | 11/1988 | Chandler | 369/112 |
| 4,797,866 | 1/1989 | Yoshikawa | 369/44.14 |

OTHER PUBLICATIONS

Product Sheets on Vernitron Piezoelectric Materials.
Product Sheet on Bendix Flexural Pivot.

Primary Examiner—Stuart S. Levy
Assistant Examiner—Robert A. Weinhardt
Attorney, Agent, or Firm—Martin LuKacher

[57] ABSTRACT

Miniature scan modules which occupy a volume of less than about 1 cubic inch so as to facilitate installation in any apparatus which requires scanning of a light beam across a target and detection of light reflected from the target. The miniature size of the scan module enables it to be incorporated in various apparatus, such as keyboards or terminals and provide them with the ability to read various symbols, particularly bar codes. The module has at least two printed circuit boards on at least one of which a source of a light beam, such as a laser diode or light emitting diode is mounted and another board which may be fixed in the apparatus in which the module is installed. The boards are interconnected by structure including a flexure which defines a pivot axis for the light source and the board on which it is mounted. The flexure is made up of a plurality of elements which are insulated from each other and provide separate conductive paths for electrical power and signals between the boards. The board on which the light source is mounted is driven to oscillate about the pivot axis, thereby scanning the beam across the target. A photo detector may be mounted on the same board as the source and receives light reflected from the target, as through a collecting lens.

27 Claims, 5 Drawing Sheets

SCAN DIRECTION

SCAN MODULES FOR BAR CODE READERS AND THE LIKE IN WHICH SCAN ELEMENTS ARE FLEXURALLY SUPPORTED

DESCRIPTION

The present invention relates to optical scanning devices and particularly to a miniature scan module which provides the facilities for scanning a light beam and receiving reflected light from a symbol, such as a bar code or other target.

The invention is especially suitable for use and providing optical scanning capability in terminals, keyboards, and data collection devices which heretofore required separate bar code readers. Because of the miniature size of the module, it can be incorporated in space which is already available or can be added without increasing significantly the size of the apparatus using the module. The invention is also applicable wherever it is desired to reduce the size of optical input devices and especially bar code readers by replacement of the optical and scanning components thereof with a unitary, replaceable scan module.

The invention avoids the need for oscillating mirrors, rotating polygons or other such optical scanning means used in previous scanning devices. This reduces the number of optical components required, consequently reducing the complexity and cost of manufacture of the scanning device. Since the scanning device has no mechanically moving parts it has an inherently long life.

Various scanners have been proposed which are movable over a target, such as a line of printed characters. Such scanners may contain solid state image sensors or cameras and rely upon ambient illumination, the scanning motion being carried out by moving the scanner on a track along the line of printed characters. See Lindberg, U.S. Pat No. 4,667,255, May 19, 1987. Scanners have used mirrors mounted on flexural supports and oscillated by electromagnetic motors. Such a mirror mount is shown in Gadhok, U.S. Pat. No. 4,732,440, Mar. 22, 1988. Bar code scanners have been proposed which contain the optical scanning components thereof mounted on a support structure, which structure is oscillated so as to scan a light beam across a bar code. See Williams, U.S. Pat. No. 4,578,571, Mar. 25, 1986. There has not heretofore been provided a universal scan module, which is of miniature size and capable of providing the beam scanning light and collecting functions, while solving problems of handling of operating power to the light source and signals from the photodetector and incorporating the optics necessary for beam shaping and light collection.

It is therefore the principal objective of the present invention to provide a miniature scan module in which all of the functions necessary for scanning and collection of light from the target which is scanned are incorporated, including handling of electrical signals and mounting of the electronic and optical elements necessary for scanning functions. It is a further object of the present invention to provide an improved scanning device which eliminates the moving mirrors that provided the scanning function in previous scanning devices, thereby resulting in lower cost due to the reduction in the number of optical components and longer life due to the elimination of mechanically moving components such as scanning motors and the like.

Briefly described, a miniature scan module in accordance with the invention has a mounting structure, which may enclose a volume of less than about 1 cubic inch. The structure is defined by at least first and second circuit boards with wiring thereon. A flexure, having a plurality of elements of conductive material in electrically insulated relationship, defines a pivot axis connecting the boards. An electrical current operated source provides a light beam. This source is mounted on and is connected to the wiring on one of the boards. Means are provided for driving the board on which the light source is mounted to execute oscillatory motion about the pivot axis and scan the beam. The wiring on the two boards is interconnected exclusively via the conductive elements of the flexure. Flexural elements can have almost infinite life. Consequently, the module can scan continuously without concern of wear or degradation of moving parts.

The foregoing and other objects features and advantages of the invention and presently preferred embodiments thereof will become more apparent from a reading of the following description in connection with the accompanying drawings in which.

Figure 1:
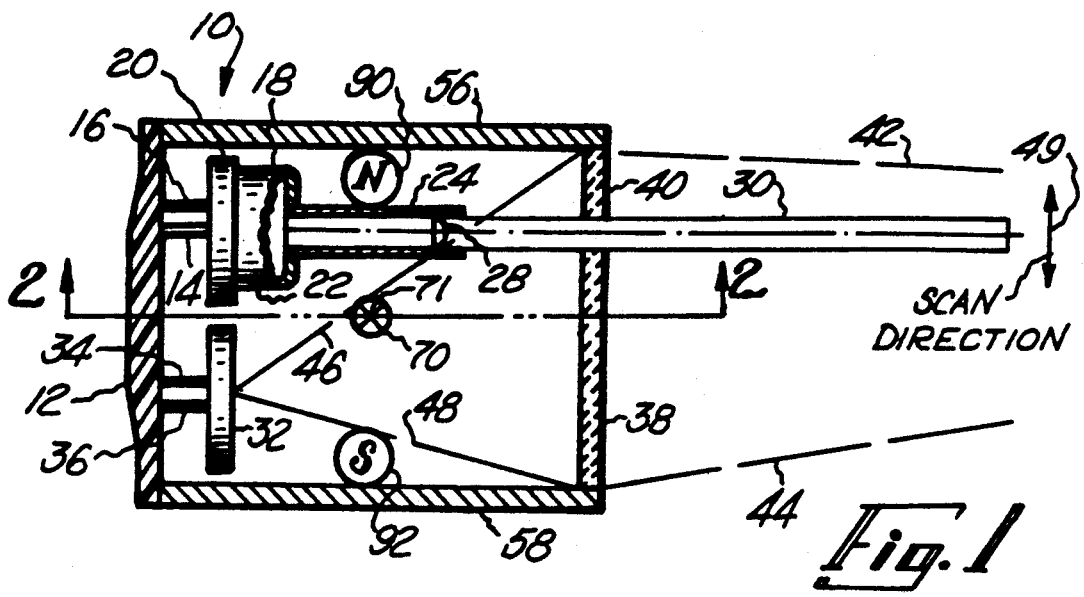
FIG. 1 is a sectional, plan view of a scan module provided in accordance with the first embodiment of the invention.

Referring to FIGS. 1–5, there is shown a scan module 10 having a circuit board 12 with printed wiring thereon for carrying current to a positive voltage lead 14 and a ground lead 16 of a semi-conductor, solid state, laser diode 18. The laser diode 18 is a generally cylindrical structure with a base disk 20 and a cylinder 22 containing the laser diode which emits light when energized by the presence of current flowing through the body of semi conductor therein. The light emanates from the front of the laser diode 18. A barrel 24 attached to the tubular section at the front of the laser diode 18 and referenced against the step 26 formed by the disk 20 supports a lens 28 in the path of a beam 30 of light which is produced by the laser diode light source 18.

Also on the circuit board 12 and adjacent to the laser diode light source 18 is a photo detector 32. Signal and ground leads 34 and 36 from the photodetector go to printed wiring on the board 12. Light is collected at the photo detector 32 by a collection lens 38 which is preferably a Fresnel lens having an opening 40 through which the beam 38 passes in the direction of the target (the bar code or other symbols). The collected light is indicated by the lines 42 and 44. The Fresnel lens focuses the light in its aperture on the detector 32 as indicated by the lines 46 and 48. In other words the Fresnel lens collects the light from the target, effectively, because of the focusing action thereof as shown by the inclination of the lines 42, 44, 46 and 48. The hole 40 in the lens may, of course, be filled with a clear flat glass, plastic or other transparent insert.

Figure 2:
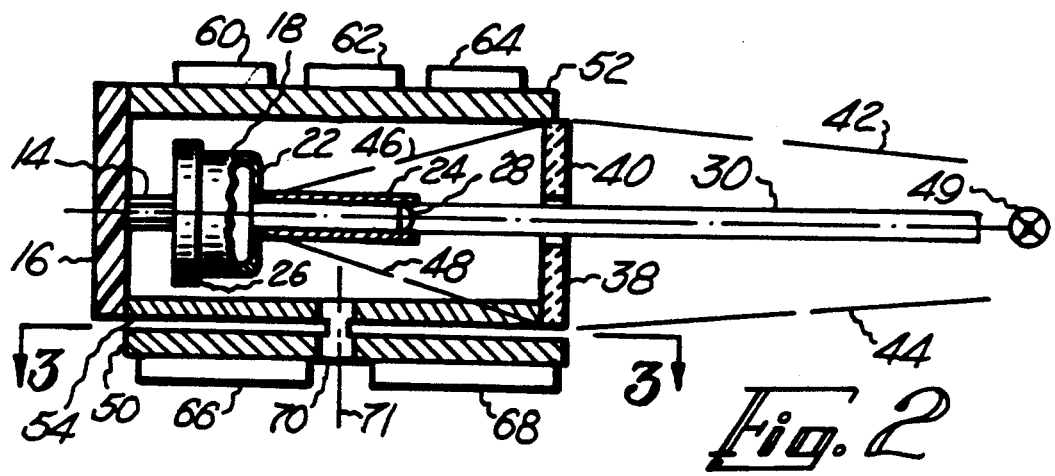
FIG. 2 is a sectional view of the module shown in FIG. 1 the section being taken along the line 2—2 in FIG. 1.

The assembly of the circuit board 12, laser source 18 and photo detector 32 is caused to oscillate in the scan direction as indicated by the line 49 having double headed arrows; the scan direction being in and out of the paper as shown at 49 in FIG. 2.

Another circuit board 50 of the scan module is desirably fixed in the apparatus in which the scan module is installed, while the rest of the module oscillates. This circuit board extends along the path of the beam 30, essentially the entire length of the scan module. The length of the module 10 is defined by two parallel circuit boards 52 and 54. The boards 52, 12 and 54 can be a single (so called wrap-around) board with 3 different sections constituting the boards 52, 12 and 54. Accordingly, reference to separate boards should also be taken to mean separate sections of the same board of a wrap around variety or the like. The boards 12, 52 and 54 and the fixed board 50 define an enclosure for the scan module 10. This enclosure may be open on the sides thereof between the boards 52 and 54. However, it is preferable to provide panels 56 and 58 to close the space between the boards 52 and 50. These panels may be circuit boards, if additional circuitry is needed in the scan module.

Circuitry such as laser regulators, detector preamplifiers, and subsequent signal processing electronics, in the form of electronic components, as shown by the blocks 60, 62, 64, 66 and 68, is mounted on the boards 52 and 54. The side panels 56 and 58 secure the Fresnel lens 38 at the front end of the module 10, which is opposite to the end defined by the board 12 on which the laser diode light source 18 and detector 32 are mounted.

In this emodiment, the circuit elements 60, 62 and 64 provide the laser regulator (a power supply which controls the current to the laser diode 18) and the preamplifier which preamplifies the signals detected by the detector 32. The components 66 and 68 on the fixed board 50 are preferably a linear integrated circuit chip 66 and a digital integrated circuit chip 68. These chips further amplify the sensor signal and may perform other digital signal handling functions. A digital signal is produced corresponding to the symbols (the arrangement of code bars) of the target. This digital signal may also be decoded in the circuit 68 to provide a digital signal indicative of the characters represented by the bar code symbol.

The only leads external to the system are a ground lead, a signal lead, which carries the signal corresponding symbol which is detected, and a power lead (e.g., 5 volts D.C.) to power the laser diode 18 via the regulating circuit chips 62, 64. These leads are connected to circuitry on the board and are connected through a flexure 70 (a flexural joint) which joins the oscillatory portion of the scan module 10 to the fixed portion, namely the board 50 thereof. The flexural joint 70 and the structural support therefor, which includes the board 54, provide the flexure means which provide a flexural support for the oscillatory portion of the module 10. The joint 70 also carries the 3 leads; power (plus 5 volts), signal and ground without the need for loose wires which are not reliable since constant flexure eventually causes fatigue failure of such wires.

The flexure 70 is sometimes referred to as a Bendix flexure since flexures of their type are available from the Bendix Company of Utica, New York, their Catalog or Pub. No. 000-6-831A. The Bendix flexure is modified in accordance with the invention to provide electrical conductive elements which carry the essential connections between the fixed and the oscillatory portions of the module.

Figure 4:
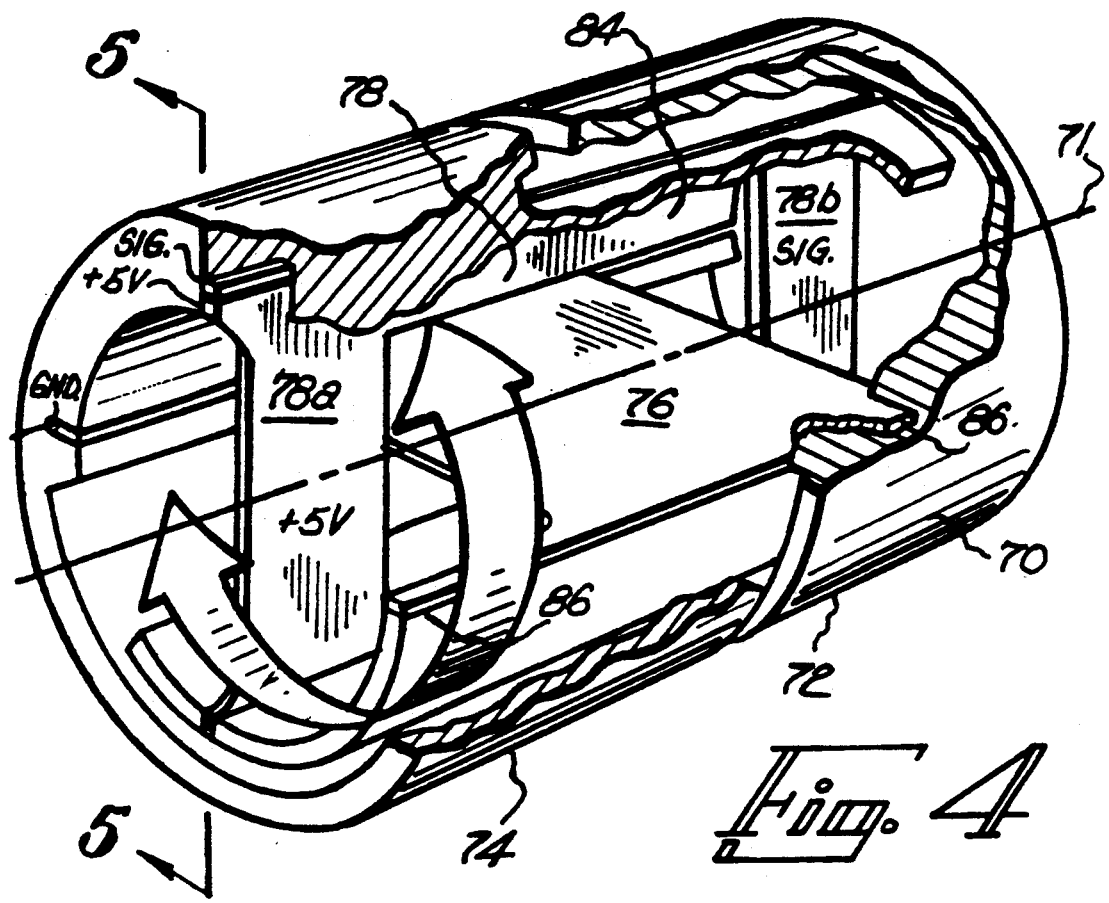
FIG. 4 is a perspective view, partially broken away, showing the flexure joint used in the scan module illustrated in FIGS. 1–3.
Figure 5:
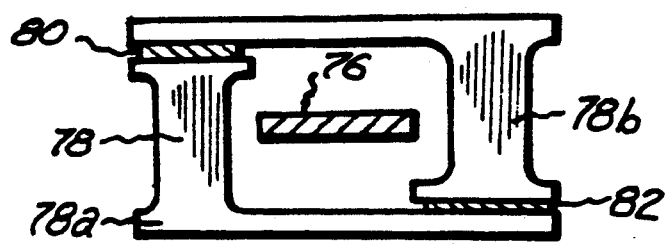
FIG. 5 is a fragmentary view showing the crossed flexure elements of the joint illustrated in FIG. 4, the section being taken generally along the line 5—5, but eliminating the tubular elements of the flexure joint.

The flexure 70 is shown in FIGS. 4 and 5. It consists of two spaced cylinders 72 and 74 defining coaxial cylindrical sections, one inside the other, so as to clamp crossed flexures 76 and 78. The flexure 78 is essentially a pair of "I" beams bridged across their top and bottom. In accordance with the invention this flexure is made in two parts 78a and 78b, which are in insulated relationship because of insulating spacers 80 and 82, as shown in FIG. 5. The "I" beam section 78a and 78b are then adapted to carry the power (plus 5 volts) and signal leads respectively. It will be appreciated that the cross member 76 is also generally "I" shape with arms 84 and 86 which extend to the printed wiring on the circuit boards 50 and 54. Similiarly the ends of the sections 78a and 78b extend to the circuit boards 50 and 52 so that connections are made there from the printed wiring thereon.

Figure 3:
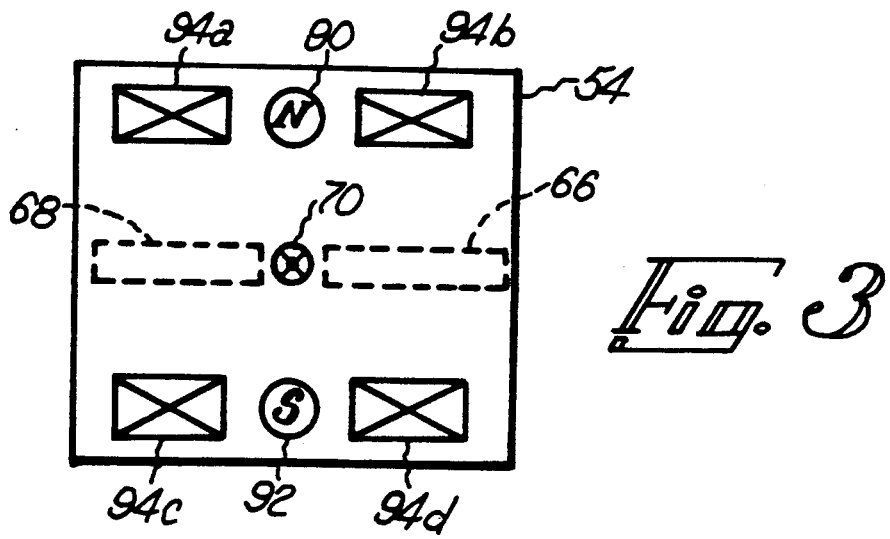
FIG. 3 is a sectional view of the scan module shown in FIGS. 1 and 2 taken along the line 3—3 in FIG. 2.

In order to drive the flexurally mounted portion of the module 10 into oscillations an electro magnetic drive structure is provided. A representative structure is shown in FIGS. 1 and 3. Permanent magnets 90 and 92, which are oppositely polarized, are disposed along a line perpendicular to the pivotal axis defined by the flexure 70. This axis is shown at 71 in the drawings. Four (quad) coils 94a, b, c and d define solenoids with axes perpendicular to the above mentioned line between the magnets. The coils are adjacent the axes of the magnets, which axes extend through the center thereof and out of the plane of the paper as shown in FIG. 3. The coils 94 may be mounted in or on the board 50. The coils are energized alternately in opposite pairs so as to drive the scan module push-pull and cause the oscillation in the scan direction 49.

The entire scan module is miniature in size and less than about 1 cubic inch in volume. For example, the width of the module may be about one inch. The height of the module may be approximately three quarter inch and the length of the module may be approximately one and one-eighth inch. The module is therefore easily accommodated in other apparatus and provides a general purpose, or scan module.

Figure 6:
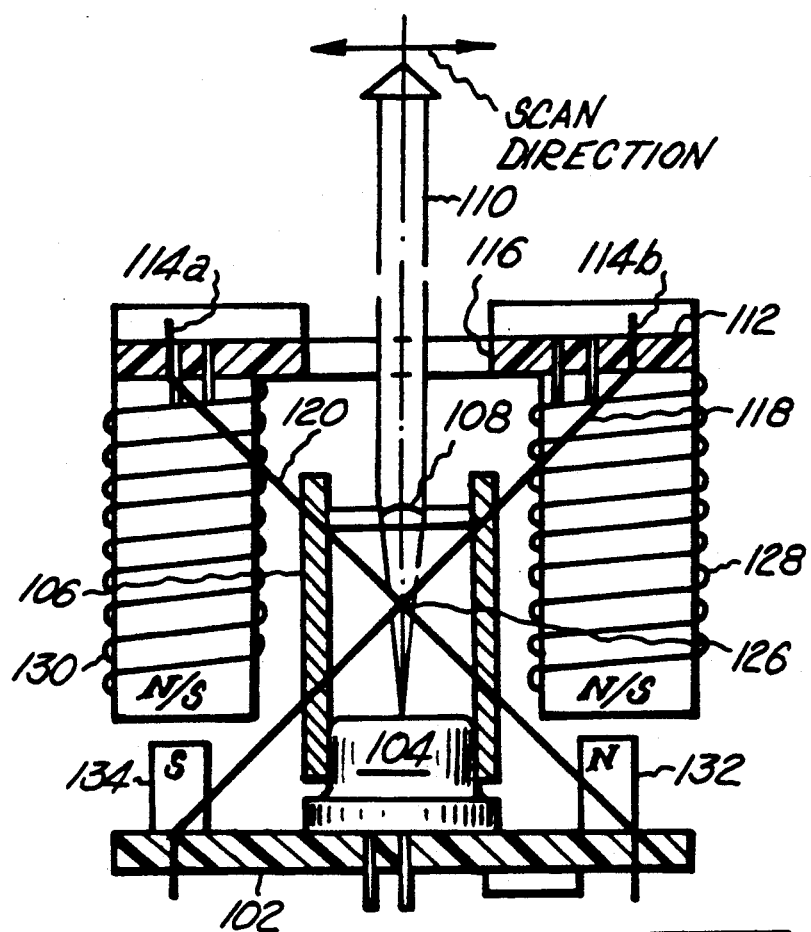
FIG. 6 is a sectional, plan view of a scan module in accordance with another embodiment of the invention.
Figure 7:
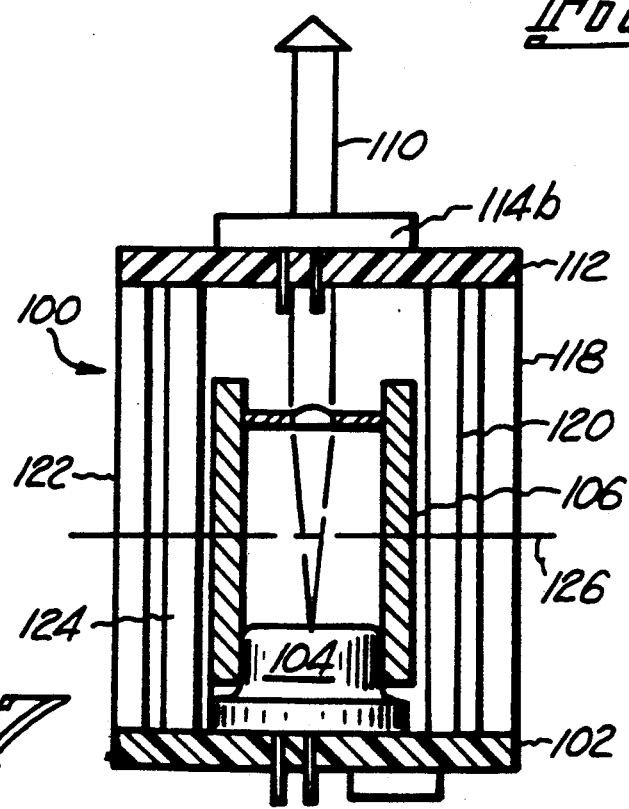
FIG. 7 is a right side, elevational view of the scan module shown in FIG. 6.

Referring to FIGS. 6 and 7 there is shown another scan module 100 having a printed circuit board 102 on which a laser diode 104 is mounted. The laser diode 104 is similar to the diode light source 18 and has a barrel 106 supporting a lens 108 which forms the light output of the diode 104 into a beam 110. The module includes another circuit board 112 on which a pair of photo detectors 114a and 114b are mounted at diametrically opposite ends of an opening 116 in the board 112 through which the laser beam 110 projects.

The detectors respond to light from the field illuminated by the beam 110 and translate that light into electrical signals which may be processed by circuitry (not shown) on the board 112. The board 112 is desirably fixed in the housing of the apparatus in which the scan module 100 is installed. This only requires 2 leads for power and ground to be connected to the laser diode 104. There are provided two sets of flexural supports 118 and 120 and 122 and 124. These supports are Z-shaped elements (e.g., bands of spring steel or bronze) which cross along a common line (their crossing being indicated at 126) which defines the pivot axis of the module about which the beam 110 oscillates.

Each of the bands of the flexure 118, 120, 121, 122 and 124 is of conductive material and therefore is capable of carrying electrical current and signals between the boards 102 and 112. Thus, four paths for current are provided, although only two need be used to carry power and ground to the board 102 on which the laser diode 104 is mounted. The other two flexures may be used to carry a control signal to activate the laser regulator, to carry monitoring signals from the laser regulator circuit or to carry other similar signals. The ends of the spring bands 118, 120, 122 and 124 extend into the boards 102 and 104 and are connected to printed wiring thereon.

Means for oscillating the beam is provided by solenoid coils 128 and 130. Permanent magnet cylinders 132 and 134 enter into the openings in the coils as the coils are energized so as to drive the board push-pull about the pivot axis 126 to oscillate the board 102 and the beam 110.

The overall size of the scan module 100 is less than one cubic inch, for example 0.8 inch by 1.10 inch by 1.10 inch. One of the 1.1 inch dimensions is between the bottom of the board 102 and the top of the detectors 114a and 114b and is the length of the module.

Figure 8:
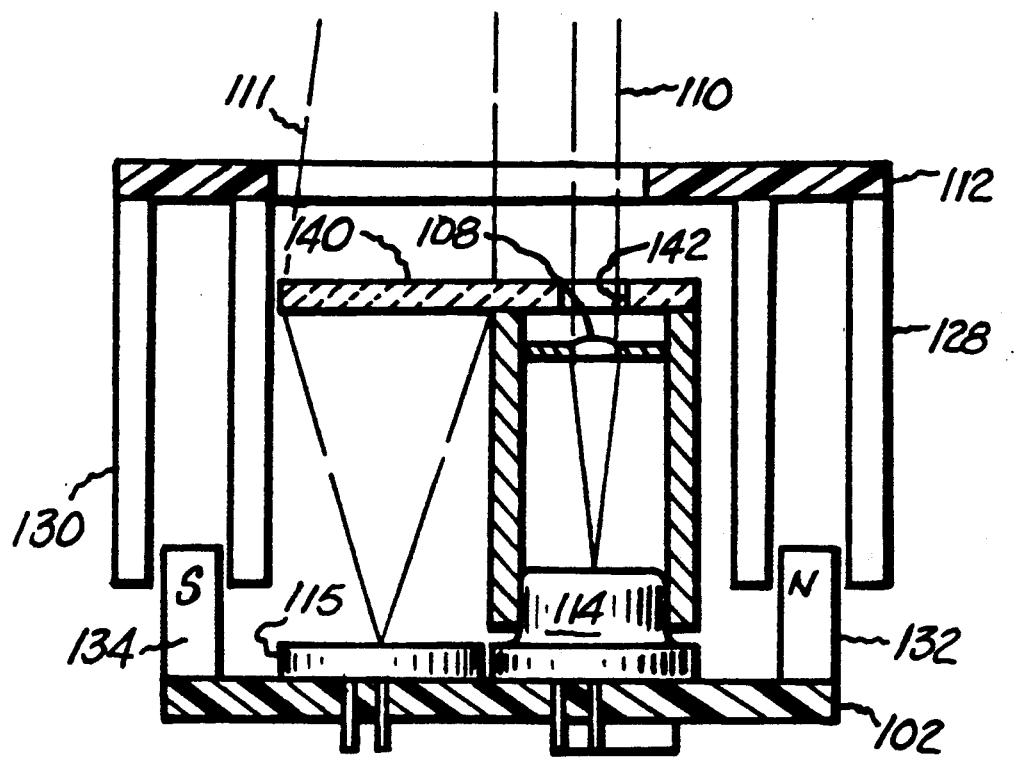
FIGS. 8 and 9 are views similar to FIGS. 6 and 7 showing a scan module in accordance with still another embodiment of the invention.
Figure 9:
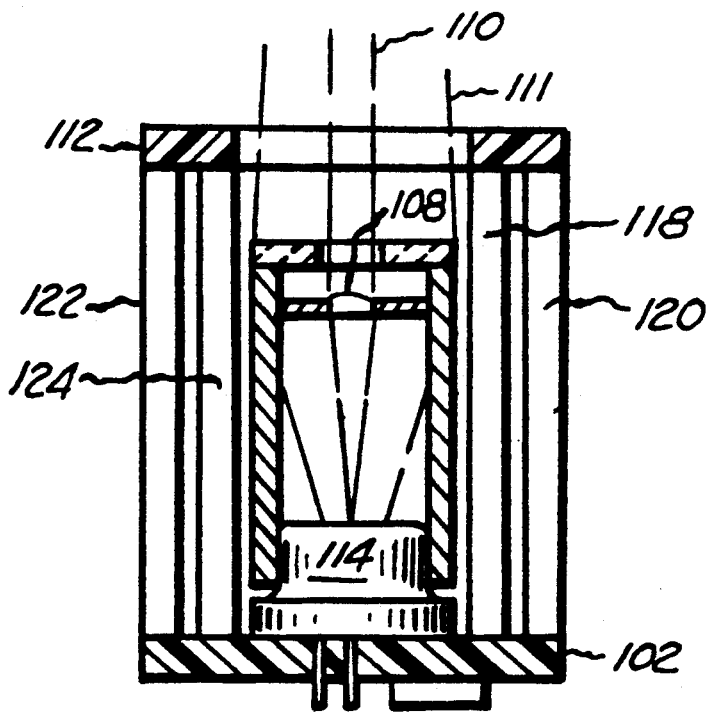

Referring to FIGS. 8 and 9 there is shown an embodiment of the invention which is similiar to that shown in FIGS. 6 and 7. A single photo detector 115 is used, which is disposed adjacent to the laser diode 114. A Fresnel lens 140 with an opening of 142 (which may be filled with clear glass, plastic or other transparent material) for the beam 110 is used to collect the reflected light beam 111 on the photo detector 115.

Figure 10:
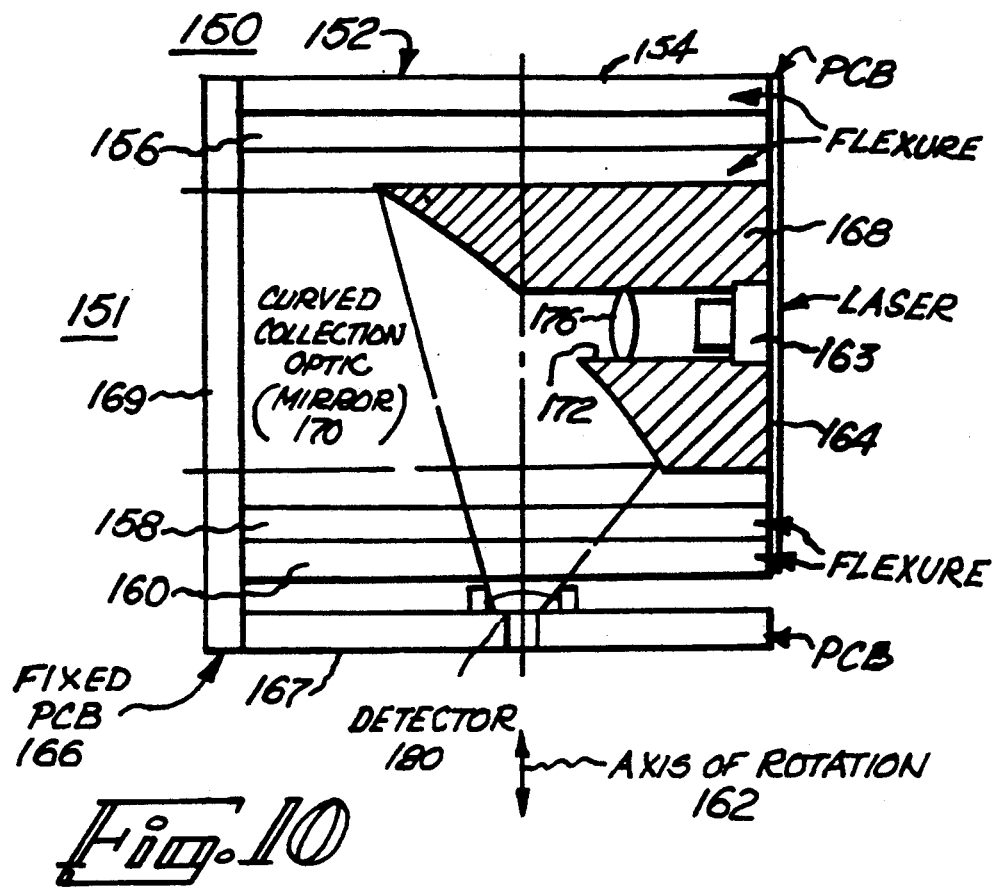
FIG. 10 is a plan view illustrating a scan module in accordance with a still further embodiment of the invention.

Referring to FIG. 10, there is shown a scan module 150 using the same type of flexure 152 as in FIGS. 6 and 7, using four bands 154-160 which defines the pivot axis 162. The diode laser 163 mounted to a moving printed circuit board 164 suspended by the flexure 150 to an L-shaped fixed circuit board 166. The fixed board 166 defines a base 167 and front wall 169 of the module. A light weight (suitably plastic) block 168 is mounted on the moving printed circuit board 164 opposite to the front wall 169, which defines the rear wall. A curved collection mirror 170 is molded into the front surface of the block 168 at about 45 degrees to the pivot axis 162.

The transmitted output (the laser beam) exits from a bore 172, in the center of the collection mirror 170. A laser beam shaping lens 176 is mounted in the base 172. The laser beam shaping lens may alternatively be molded in the center of the collection mirror 170. The axis of rotation 162 is through the center of the receiver collection mirror 170 and the center of a photo detector 180.

The collected light is therefore centered on the detector 180 no matter which way the beam is pointing during the scan. The mirror 170 is preferrably curved to focus on the detector 180. A flat mirror may be used. Then an additional collection lens may be disposed in front 151 of the module 150.

A driver, such as the electromagnetic drive assembly shown in FIGS. 6 and 7 (e.g., the coils 128, 130 and magnet cylinders 132, 134) may be used to oscillate the movable board, the assembly mounted thereon to scan the beam across the symbols (bar code). The scattered light is collected by the mirror 170 and detected by the detector 180. Connections to the laser diode 163 may be through the flexure bands 158 and 160 as discussed heretofore.

Figure 11:
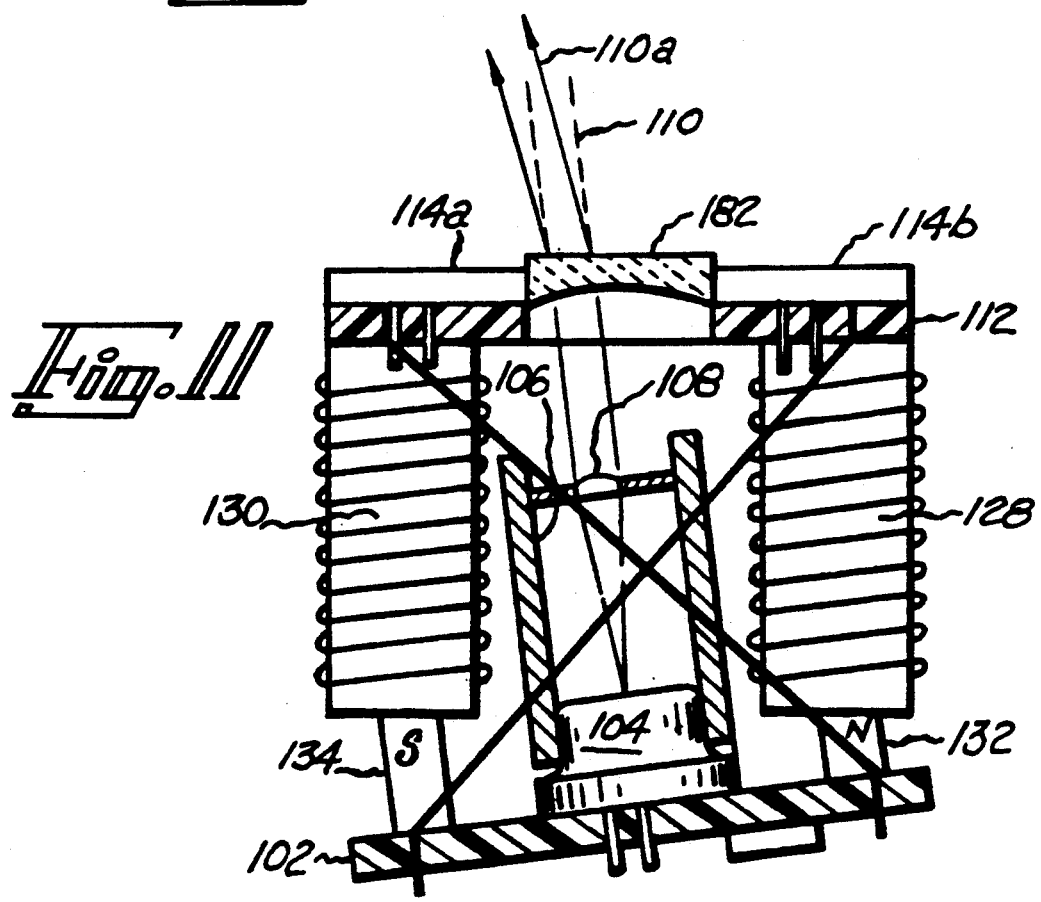
FIG. 11 is a view similar to FIG. 6 which embodies optics for increasing the scan angle.

Referring to FIG. 11, there is shown another embodiment of the invention similar to that of FIGS. 6 and 7. The board and diode are shown tilted at one end of the scan. To increase the scan angle and, if desired, to linearize the scan, optics are used. These optics are shown as a negative lens 182. The beam 110 is bent outward to the position shown at 110a. The scan angle is therefore increased by the lens. To compensate for divergence which would otherwise be introduced by the lens 182, the power of the lens 108 may be increased or its position in the barrel 106 changed to refocus the beam.

From the foregoing description, it will be apparent that there has been provided miniature scan modules which are generally universally adaptable for use in providing scanning capabilities (e.g., bar code reading capability) in various types of apparatus, particularly portable terminals, keyboards and other data collection devices which require optical information inputs from symbols which are scanned by a light beam. While several embodiments of the invention have been described, variations and modifications thereof, within the scope of the invention, will undoubtedly suggest themselves to those skilled in the art. For example, the flexures 118 and/or 120 may be piezoelectric bi-morphic or unimorphic elements. Piezoelectric polymer film on flexible bands may be used to provide these elements. Piezoelectric bi-morphic or unimorphic elements are discussed in data sheets published by Vernitron Piezoelectric of 232 Forbes Road, Bedford, Ohio, U.S.A. These piezoelectric flexural elements may then provide the mechanical force needed to provide the scanning motion of the module as well as the conduction paths. Accordingly the foregoing description should be taken as illustrative and not in a limiting sense.

We claim:

1. A miniature scan module which comprises a mounting structure, said structure being defined by at least first and second circuit boards with wiring thereon, flexure means having at least two elements of conductive material defining a pivot axis connecting said boards, an electrical current operated source providing a light beam, said source being mounted on and connected to the wiring on a first of said boards, means for driving said first board to execute oscillatory motion about said pivot axis and scan said beam, and said wiring on said first board and second board being connected to each other exclusively via said elements of said flexure means.

2. The scan module according to claim 1 further comprising at least one photo detector mounted on said first board adjacent to said source.

3. The scan module according to claim 2 wherein said second printed circuit board extends in a direction along the path of said beam, a flexural joint having crossed flexures, one of the crossed flexures having sections which are insulated from each other and extending between said second board and said first board and providing said elements of conductive material.

4. The scan module according to claim 3 further comprising a third board and a fourth board opposite to said third board and defining an enclosure with at least one end and opposite sides, within which enclosure said photodetector and source are disposed, said first board defining said one end of said enclosure and said third and fourth boards defining said sides of said enclosure, said second board being disposed parallel to said third board with said joint there between.

5. The scan module according to claim 4 further comprising a barrel mounted on said source, a lens in said barrel through which said beam passes out an end of said enclosure opposite to said one end.

6. The scan module according to claim 5 further comprising a second lens mounted in said opposite end and which collects light at said photo detector, said second lens having an opening therein in alignment with said first named lens for passage of said beam.

7. The scan module according to claim 6 wherein said second lens is a Fresnel lens.

8. The scan module according to claim 4 wherein said driving means comprises an electro magnetic driver having permanent magnet elements on said third board and coils on said second board.

9. The scan module according to claim 8 wherein said source is a solid state laser device.

10. The scan module according to claim 1 wherein said first and second boards are parallel, said flexure means comprising at least two band springs of material which bands cross at said pivot axis, said bands extending between inside surfaces of said boards which face each other.

11. The scan module according to claim 10 wherein source is mounted on the inside surface of said first board, said second board having an opening therein through which said beam passes.

12. The scan module according to claim 11 wherein at least one photo detector is mounted on the outside of said second board.

13. The scan module according to claim 12 further comprising a plurality of photo detectors including said one photo detector mounted on said outside of said second board along edges of said opening which are opposite to each other.

14. The scan module according to claim 11 further comprising at least one photo detector mounted on the inside of said board adjacent to said source.

15. The scan module according to claim 11 further comprising a barrel attached to said source and extending between said boards, a lens mounted in said barrel for forming light from said source into said beam.

16. The scan module according to claim 15 wherein said source is a semi-conductor laser device.

17. A miniature scan module having a fixed plate member which defines a base and has a first wall extending therefrom, a flexure defining an axis of rotation spaced from said first wall and transverse to said base, a movable second wall opposite to said first wall and connected thereto by said flexure, means for moving said second wall, said axis being between said first and second walls, a light source on said second wall which projects a beam out of said module in a direction transverse to said axis which scans when said second wall is moved to scan said beam, a detector on said base along said axis, and a mirror mounted on said second wall for collecting light entering said module through said first wall and directing said light onto said detector.

18. The scan module according to claim 17 which said light source is a solid state laser.

19. The scan module according to claim 17 wherein said mirror has a reflective surface which is disposed about 45 degrees to said axis.

20. The scan module according to claim 19 wherein said mirror surface is selected from the group consisting of a flat and a curved reflective focusing surface.

21. The scan module according to claim 20 wherein said mirror has an opening through which said beam passes.

22. The scan module according to claim 21 further comprising a block having a base, said block being mounted on said second wall, said laser being disposed in said base and said mirror surface being disposed on a front surface of said block.

23. The scan module according to claim 22 further comprising a lens in said base through which said beam passes and is shaped.

24. The scan module according to claim 1 further comprising means including an optical element on said second board for increasing the scan angle of said beam.

25. The scan module according to claim 17 further comprising an optical element on said first wall in the path of said beam for increasing the scan angle of said beam.

26. The scan module according to claim 1 wherein said flexure means includes a piezoelectric element.

27. The scan module according to claim 1 wherein the mounting structure encloses a volume of less than about one cubic inch.

* * * * *